United States Patent [19]

Chever

[11] 4,054,213
[45] Oct. 18, 1977

[54] APPARATUS FOR REMOVING BULK MATERIAL FROM A STORAGE BED

[75] Inventor: Rene Chever, Paris, France

[73] Assignee: Fives-Cail Babcock, Paris, France

[21] Appl. No.: 738,539

[22] Filed: Nov. 3, 1976

[30] Foreign Application Priority Data

Nov. 4, 1975 France .................................. 75.33622

[51] Int. Cl.² ............................................ B65G 65/28
[52] U.S. Cl. ........................................ 214/10; 198/301;
198/303; 198/306; 198/507
[58] Field of Search ................... 214/10; 198/301, 303,
198/306, 507, 509, 511, 518, 560

[56] References Cited

U.S. PATENT DOCUMENTS 3,285,385  11/1966  Langner ............................. 198/301

FOREIGN PATENT DOCUMENTS 2,311,722  3/1973  Germany .............................. 198/518

Primary Examiner—Robert J. Spar
Assistant Examiner—George F. Abraham
Attorney, Agent, or Firm—Kurt Kelman

[57] ABSTRACT

Apparatus for removing bulk material from a storage bed comprises a pivotal beam carrying a bucket wheel on one end for taking up the bulk material and an endless band conveying the bulk material to the other end of the beam, and a girder carrying an endless band conveying the bulk material received at one end of the girder to the other end thereof, whence it is removed. The one beam end is supported on a pair of driving wheels adjacent the bucket wheel, the driving wheels being symmetrically arranged with respect to the beam. A coupling supports the other end of the beam on the one end of the girder for pivoting about a vertical axis. Two wheels with stationary axles support the ends of the girder, the wheel axles extending parallel to the girder, one of the wheels being disposed in the vertical pivoting axis and the other wheel being a driving wheel supporting the other end of the girder.

6 Claims, 12 Drawing Figures

APPARATUS FOR REMOVING BULK MATERIAL FROM A STORAGE BED

The present invention relates to improvements in apparatus for removing bulk material from a storage bed and is designed to simplify the structure of such apparatus to make the same more economical.

The improved apparatus comprises a first elongated element for collecting the bulk material from the storage bed and having a bulk material engaging device, such as a bucket wheel, at one end arranged to take up bulk material from the storage bed and conveying means arranged to convey the bulk material from the device to the other end, and second elongated element arranged adjacent the other end of the first element for receiving the conveyed bulk material therefrom and conveying the received bulk material away from the storage bed. Two driving and guiding wheels support the end of the first elongated element on the storage bed adjacent the bulk material engaging device, the two driving and guiding wheels being arranged symmetrically with respect to a vertical plane passing through the longitudinal axis of the first element. A coupling supports the other end of the first elongated element on one of the ends of the second elongated element, the coupling being arranged to permit pivoting of the first element in relation to the second element about a vertical axis passing through the coupling and to absorb vertical and horizontal forces. Two wheels respectively support the ends of the second elongated element, one of the wheels being disposed in the vertical pivoting axis and the other wheel being a driving wheel supporting the other end of the second element.

The above and other objects, advantages and features of the present invention will become more apparent from the following detailed description of a now preferred embodiment thereof, taken in conjunction with the accompanying schematic drawing wherein FIG. 1 is a side elevational view of an apparatus according to this invention, the bulk material collecting element and the bulk material transmitting element being shown in their aligned position;

Figure 1:
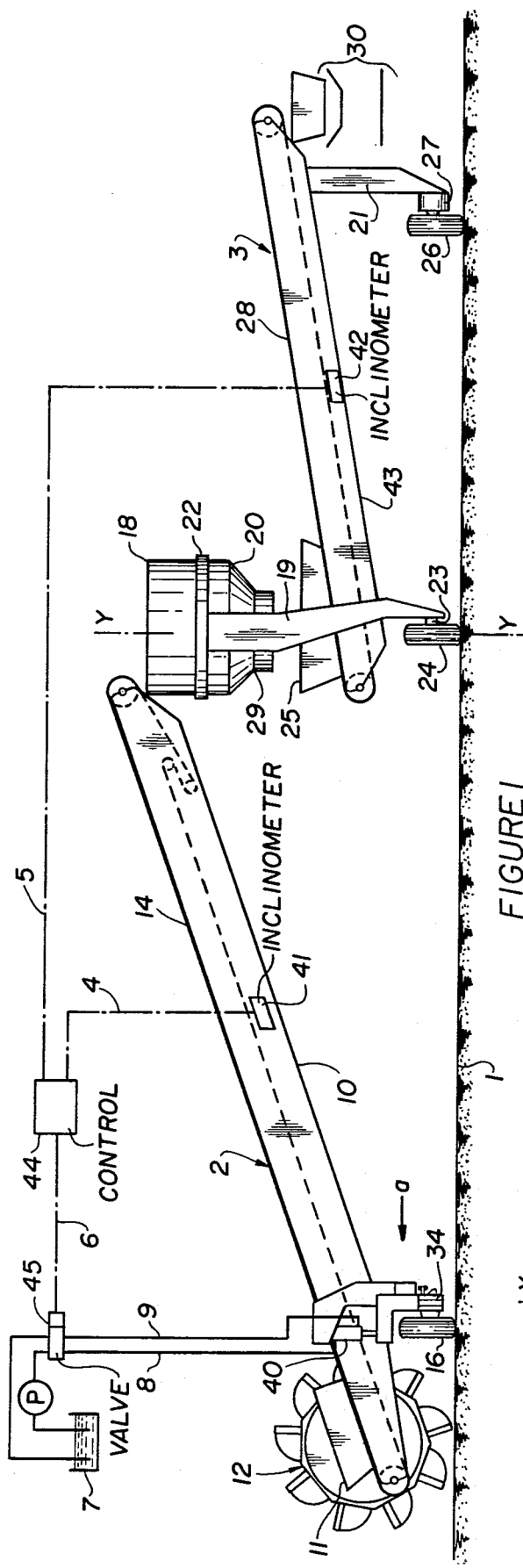

FIGS. 4 to 12 diagrammatically show the operation of the apparatus.

Referring now to the drawing, the apparatus is placed atop a layer 1 of bulk material, which constitutes a storage bed from which bulk material is to be collected and removed to discharge means 30 which may be constituted by a conveyor, a chute or the like, alongside the storage bed. The apparatus is of the type comprising two elements coupled together by a pivotal connection having a vertical axis extending substantially perpendicular to the storage bed. One of the elements serves to collect the bulk material from the storage bed and the other element receives the collected bulk material and conveys it to the discharge means runnung along the edge of the storage area.

As shown, bulk material collecting element 2 comprises beam 10 carrying endless conveyor band 14 running the length of the beam from one end thereof to the other. Bucket wheel 12 is rotatably mounted at one end of beam 10 for taking up bulk material from storage bed 1 as the buckets of the rotating wheel engage the bed and to discharge the collected bulk material into hopper 11 which delivers the material to endless conveyor band 14. Adjacent the bulk material collecting bucket wheel, beam 10 is supported on storage bed 1 by a pair of like driving wheels 16 provided with pneumatic tires. The other end of beam 10 is coupled to bulk material conveying element 3. This coupling comprises support ring 18 affixed to the other beam end and resting on coaxial support ring 20, the two support rings being interconnected by ball or roller bearing 22 capable of transmitting from one element to the other forces parallel and perpendicular to vertical pivot axis y—y passing through rings 18, 22, 20.

Support ring 20 is mounted on bracket 19 above girder 43 of bulk material conveying element 3, this bracket and bracket 21 supporting the respective ends of girder 43 on wheels 24 and 26 each of which is also provided with a pneumatic tire. Thus, coupling 18, 22, 20 permits beam 10 to pivot about vertical axis y—y, i.e. the end of the beam opposite to the pivotal coupling may revolve thereabout to move element 2 into different angular positions with respect to element 3.

The axles of wheels 24 and 26 are stationary and parallel to the longitudinal axis of girder 43. As shown in FIG. 1, wheel 24 is aligned with pivoting axis y—y and it is loosely mounted on its axle of rotation 23 so that it may normally freely rotate on this axle. However, a brake system enables the wheel to be held against rotation on axle 23. Wheel 26 is a driving wheel entrained by motor 27 on the output axle on which wheel 26 is mounted. This motor may be an electric or hydraulic motor. If desired, rails may be provided on the storage area for guiding wheels 24 or 26

Girder 43 of bulk material conveying element 3 carries endless conveyor band 28 running its entire length from one end to the other. The bulk material collected by bucket wheel 12 and conveyed to the other end of element 2 by endless conveyor band 14 is discharged therefrom through channel 29 in the interior of the pivotal coupling into hopper 25 which delivers the material to conveyor band 28 for discharge into material discharge means 30 running along the edge of the storage area.

Figure 3:
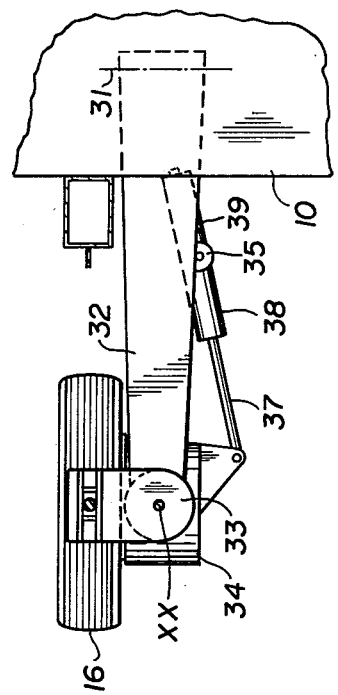
FIG. 3 is a section along line 3—3 of FIG. 2.
Figure 2:
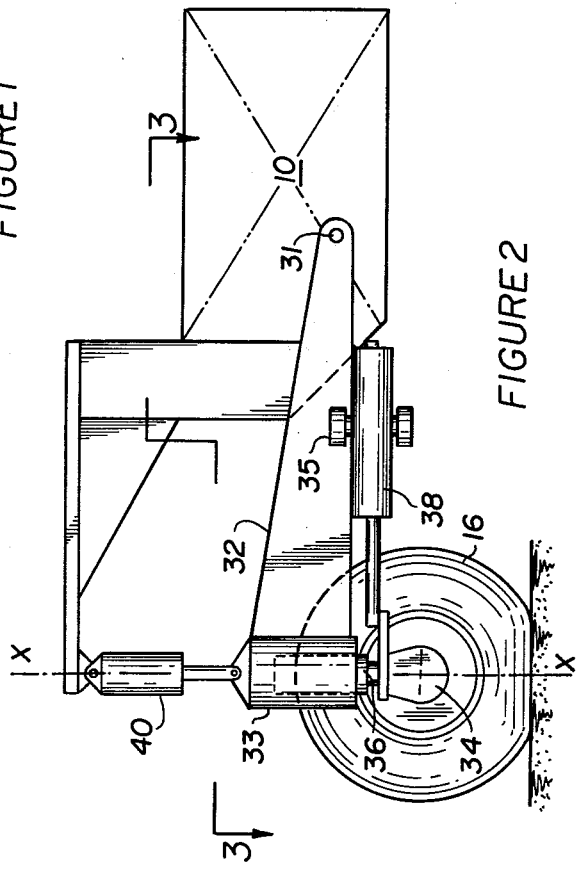
FIG. 2 is an end view of one end of the bulk material collecting element, seen in the direction of arrow a of FIG. 1, only one driving wheel being shown while the other driving wheel is arranged symmetrically with respect to a vertical plane parallel to the axis of the beam of this element.

The support of the one end of beam 10 of bulk material collecting element 2 next to bucket wheel 12 and opposite the pivoted end of the beam is best shown in FIGS. 2 and 3. While these figures only show one wheel 16, a pair of like wheels 16 support this end of the beam, the non-illustrated wheel being mounted in the same manner as illustrated wheel 16 symmetrically with respect to the beam, as may be seen in FIGS. 4 – 12. Each wheel is mounted at the end of arm 32 pivoted to beam 10 at horizontal pivot 31. The wheel is mounted directly on motor 34 on whose crankcase is affixed vertical pivot pin 36 whose axis x-x is spaced from the wheel and which is journaled rotatably in bushing 33 integral with arm 32. Double-acting jack 38 has its piston rod 37 linked to the motor crankcase while its cylinder 39 is linked to beam 10. The jack cylinder is mounted on bracket 35 on arm 32. Operation of jack 38 in a manner to be described hereinafter permits wheel 16 to pivot about vertical axis x—x of pivot pin 36 so that wheels 16 may be turned into a desired direction and held in this position.

Each arm 32 is furthermore connected to beam 10 by jack 40, which is in vertical alignment with the associated wheel 16 when the wheel has been oriented by jack 38 to assume a direction perpendicular to the axis of beam 10, as shown in FIG. 3. Operation of jack 40 permits vertical adjustment of beam 10 and, correspondingly, bucket wheel 12 with respect to the level of storage bed 1 on which wheels 16 run.

Hydraulic jacks 38 receive hydraulic fluid through a fluid distributing valve system permitting wheels 16 to be maintained in three particular positions: a first position wherein the axes of the pair of wheels 16 converge on pivoting axis y-y of bulk material collecting element 2 (see FIGS. 7, 8 and 11, for example) and two other positions wherein the wheel axes converge on two points respectively to the left and to the right of axis y—y (for example, FIGS. 5, 6, 9 and 10). In addition, the wheels may also be oriented by jacks 38 so that their axes are perpendicular to beam 10.

The hydraulic fluid distributing valve system controlling the operation of jacks 38 for orienting driving wheels 16 of bulk material collecting element 2 is, in turn, controlled by means mounted on beam 10 for sensing the relative directional positions of elements 2 and 3 as well as means mounted on jacks 38 for sensing the positions of wheels 16 relative to beam 10. These control means (not shown) may be constituted by circuit breakers controlled by reeds.

The operation of the apparatus will now be more fully explained in conjunction with FIGS. 4 to 12 digrammatically illustrating various relative positions of bulk material collecting element 2 and bulk material conveying element 3.

When the motors of driving wheels 16 are started, element 2 is pivoted about vertical axis y—y in one direction or the other, depending on the direction of rotation of the wheels. This direction of rotation may be periodically reversed by suitable sensing means (not shown) indicating the relative angular position of element 2 with respect to element 3. Wheel 24 is displaced in rectilinear direction along the storage bed.

Figure 11:
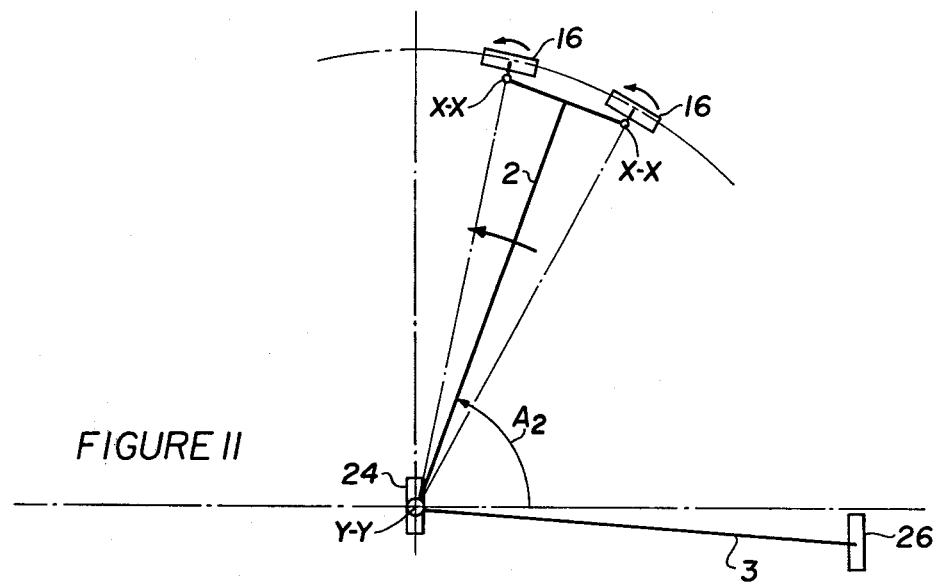
Figure 12:
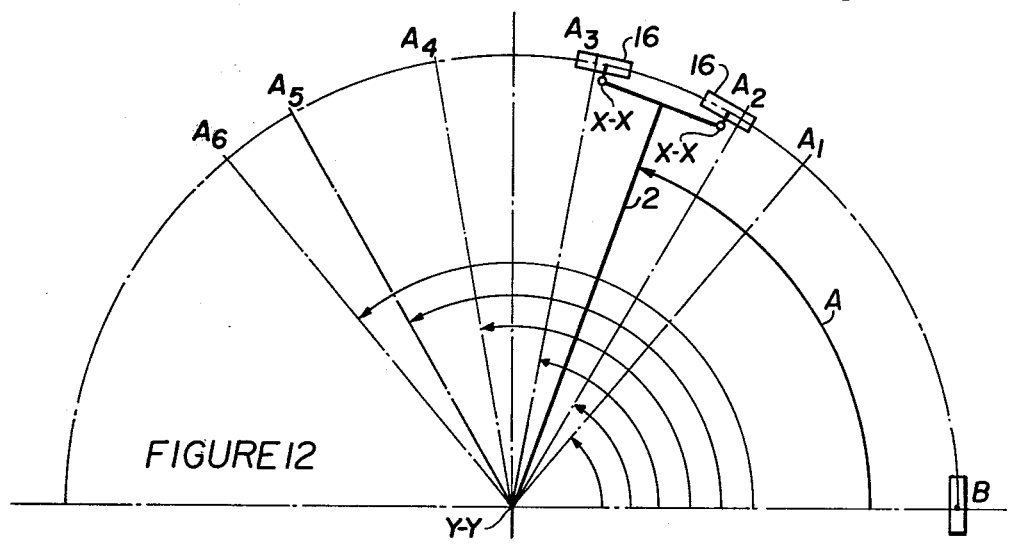

As shown in FIG. 12, in order to obtain a substantially constant output of collected bulk material, the pivoting speed of element 2 about axis y—y is variable for angles of orientation of element 2 with respect to element 3 between $A_1$ and $A_3$, constant between angles $A_3$ and $A_4$, and again variable for the angles between $A_4$ and $A_6$, $A_1$ and $A_6$ indicating the end positions attainable by element 2. In other words, beam 10 may be pivoted about coupling 18, 22, 20 between angular position $A_1$ and angular position $A_6$ as the apparatus moves rectilinearly along storage bed 1 on wheels 24 and 26. During this pivoting or sweeping motion of bucket wheel 12 over bed 1 to collect bulk material therefrom, wheels 16 are oriented in a manner shown in FIGS. 5 to 11.

Figure 4:
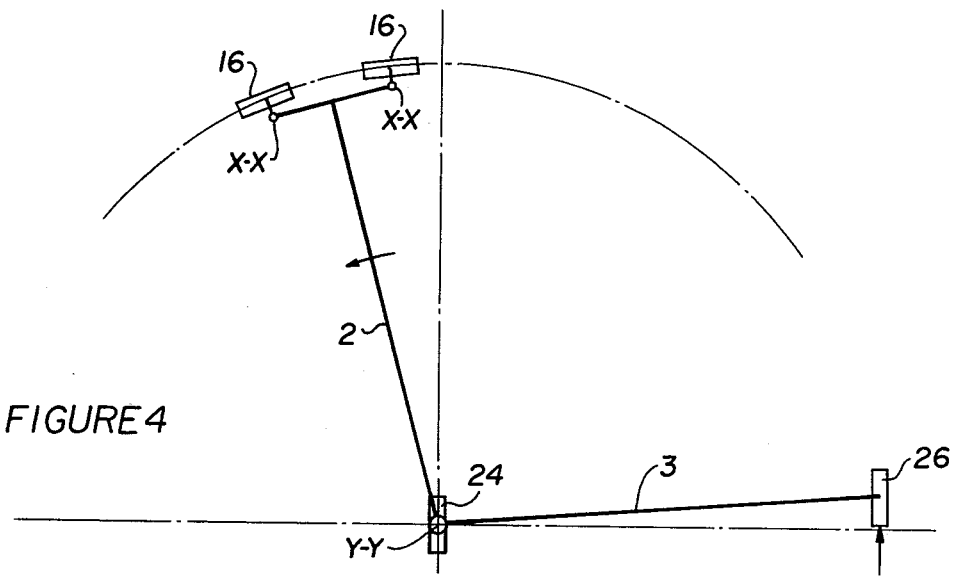

In FIG. 4, the apparatus is shown pivoting about axis y—y in the direction of increasing angles between elements 2 and 3. During this phase of operation, wheel 24 is maintained stationarily on its axle by applying a brake thereto and driving wheel 26 is displaced by a distance equal to the longitudinal advance of the apparatus at each pass.

Figure 5:
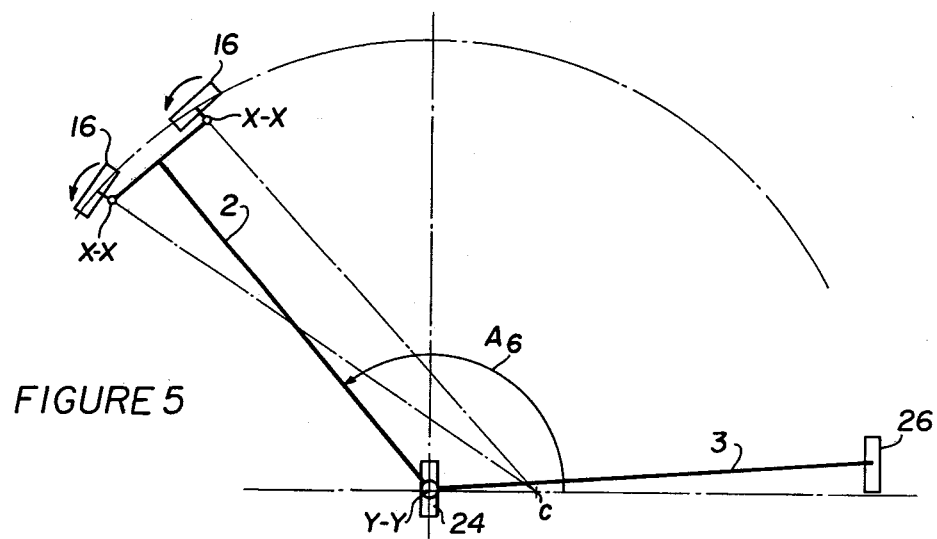

In FIG. 5, the apparatus is shown in end position $A_6$. This angular position is sensed and the angular position sensing element operates the hydraulic fluid valve distributing system so that the two chambers of hydraulic cylinder 39 are in communication, thus permitting the fluid to flow freely between the cylinder chambers and wheels 16 to be freely oriented. Since the wheels are driven by their motors in the direction corresponding to the increase of the angle between elements 2 and 3, they will be pivoted about axes x—x counterclockwise, as shown by the curved arrows at wheels 16. When the axles of rotation of the wheels converge upon a predetermined point C at the right of axis y—y, as shown in FIG. 5, sensing elements which detect the relative position of the wheels to beam 10 operate the hydraulic fluid flow to jacks 38 so that no flow takes place between the cylinder chambers, thus locking the wheel axles in this directional position.

Figure 6:
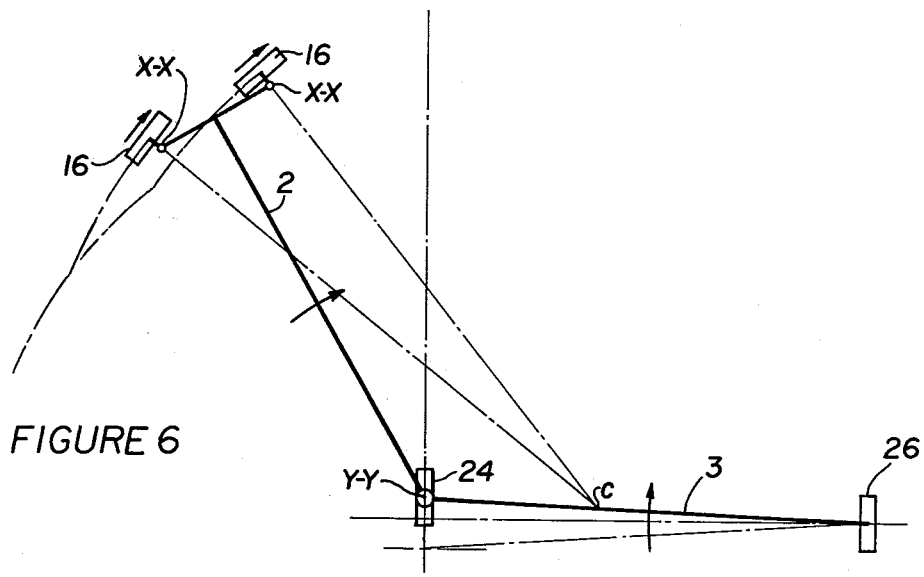
Figure 7:
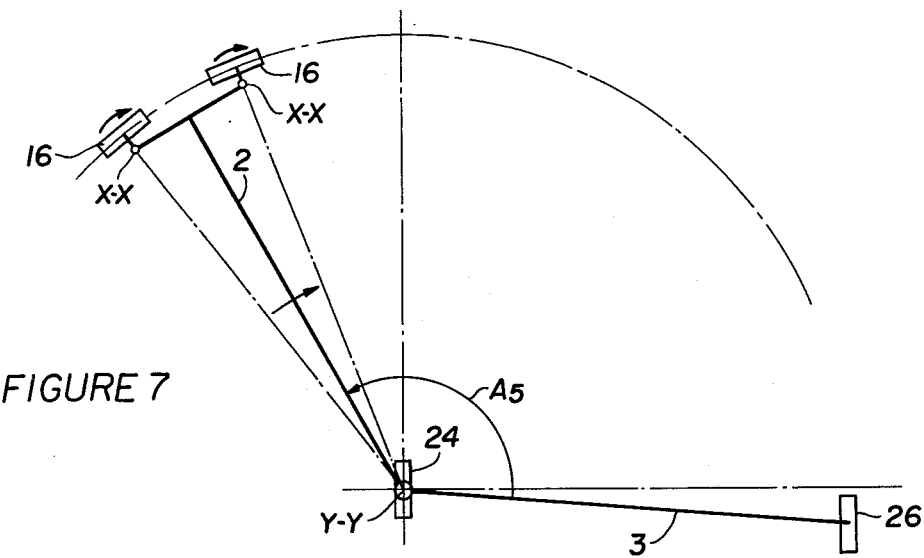
Figure 8:
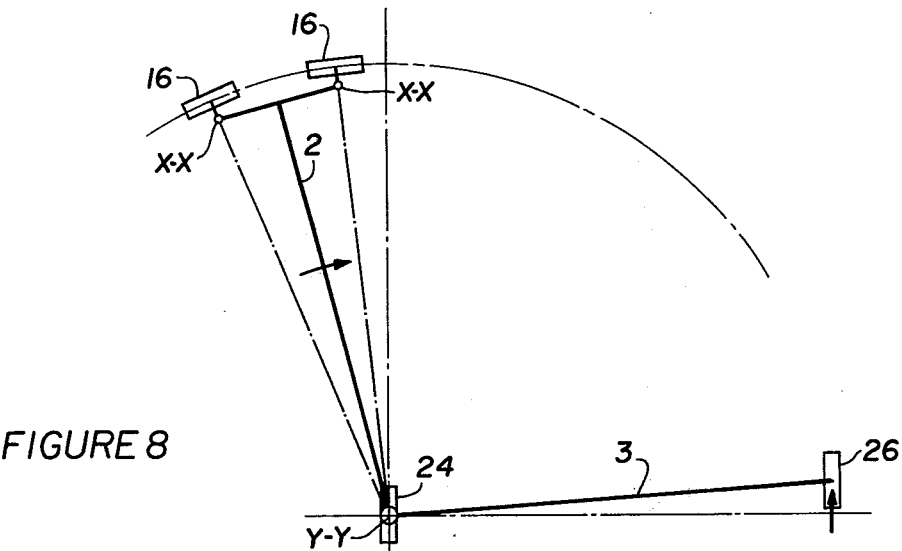

At this point, the rotational direction of wheels 16 is reversed so that the bulk material collecting element moves back towards bulk material conveying element to decrease the angle between elements 2 and 3, as shown in FIG. 6. Since wheels 16 are displaced along a circular arc whose center does not lie in pivoting axis y—y, collecting element 2 advances during this operating phase towards the pile of bulk material and entrains during this displacement wheel 24 which has previously been unblocked, i.e. from which the brake has been released. Upon reaching a predetermined position $A_5$ (see FIG. 12), the angular sensing elements again control the hydraulic fluid flow so as to place the two cylinder chambers of jack 38 in communication, thus permitting free pivoting of wheels 16. Still driven in the same direction, the wheels pivot about axes x—x in the direction of the arrows shown in FIG. 7 until the wheel axles converge on axis y—y. Sensing of this angular position again causes hydraulic fluid flow between the jack chambers to be blocked so that element 2 pivots through the position shown in FIG. 8 into end position $A_1$ shown in FIG. 9, with wheels 16 remaining oriented in the same position. As shown in FIG. 8, wheel 26 is displaced during this operational phase a distance equal to the advance of the apparatus.

Figure 9:
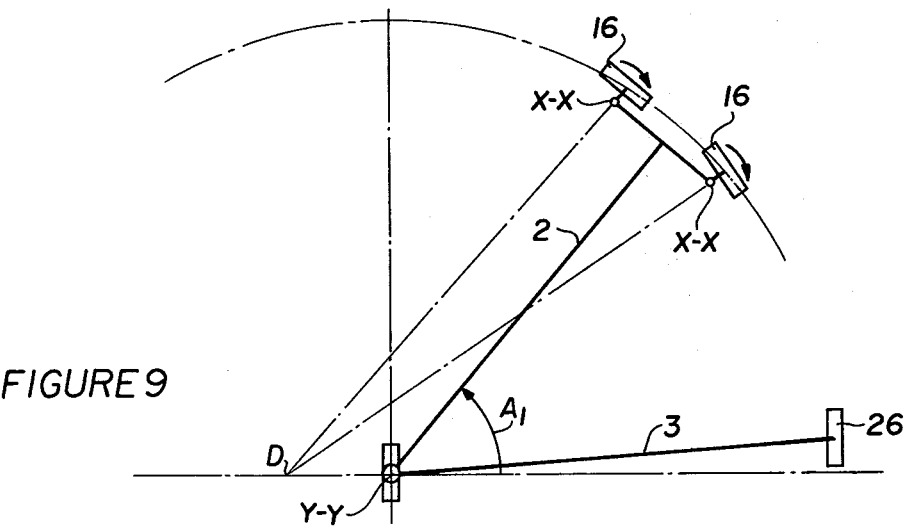
Figure 10:
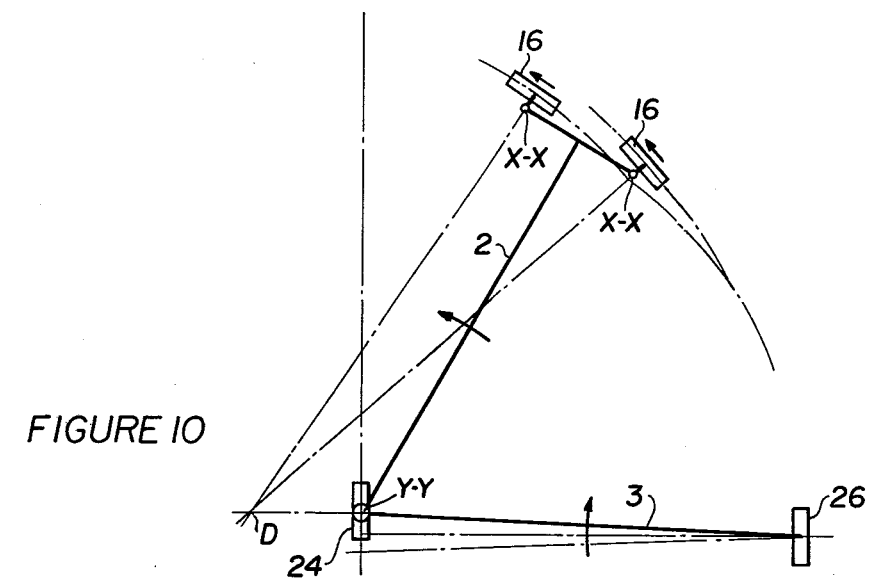

As will be seen from FIG. 9, when element 2 reaches end position $A_1$, jacks 38 are again unblocked so that wheels 16 pivot about their axes x—x in the direction of the arrows shown in this figure, i.e. clockwise. The wheel axles are then blocked again by means of jacks 38 so that they converge on a predetermined point D at the left of axis y—y. Wheels 16 are now driven in the opposite direction to reverse the sweep back to end position $A_1$ and this drive causes a simultaneous advance of bulk material collecting element 2, entraining idler wheel 24 while driving wheel 26 remains stationary (FIG. 10).

When, as shown in FIG. 11, element 2 assumes intermediate angular position $A_2$, jacks 38 are unblocked again and wheels 16 are pivoted in the direction of arcuate arrows shown in FIG. 11, i.e. counterclockwise, until the axles of rotation of wheels 16 again converge on pivoting axis y—y. The jacks are then blocked again to hold the driving wheels in a unchanged position during the pivoting movement of element 2 to end position $A_6$.

Since driving wheel 26 is displaced at the edge of the storage area, outside the storage bed 1 of the bulk material which is to be collected and removed, its axle remains at a constant height above the ground on which it runs. On the other hand, driving wheels 16 and idling wheel 24 are displaced on the storage bed which is covered by a pile or layer of the bulk material forming a very irregular surface. The height of these wheels relative to the bottom of the bed and thus the height of beam 10 varies during the operation, as more and more bulk material is removed. However, it is necessary to hold bucket wheel 12 at a constant height with respect to the bed bottom to leave a bulk material layer of minimal thickness on the ground. For this purpose, jacks 40 automatically adjust the relative vertical position of wheels 16 and beam 10 so as to maintain bucket wheel 12 at a substantially constant level despite the irregularities of the surface of bulk material on which wheels 16 and 24 run.

This automatic vertical adjustment control comprises two inclinometers 41 and 42 which are placed, respectively, on beam 10 and girder 43 to detect the inclination of these elements relative to horizontal. An electric control circuit 4, 5 connects the respective inclinometers to control 44 to deliver thereto two analogue signals (electric voltages) proportional to the inclinations of beam 10 and girder 43. The two control signals are combined in control 44 which produces an output signal proportional to the difference between the actual vertical position of bucket wheel 12 and a desired optimum position determining the residual layer of bulk material left on the storage bed after the bucket wheel has removed the material therefrom. Control circuit line 6 transmits the output signal from control 44 to valve 45 which controls the flow of hydraulic fluid from sump through hydraulic conduits 8 and 9 connected to the chambers of the cylinder of jack 40. Depending on this control signal, jack 40 will raise or lower beam 10 and, with it, bucket wheel 12. When there is no difference between the actual and optimum vertical position of the bucket wheel, no hydraulic fluid will be fed to jack 40, thus holding the bucket wheel in the optimum position.

What is claimed is:

1. An apparatus for removing bulk material from a storage bed of the material, comprising
   a. a first elongated element for collecting the bulk material from the storage bed, the first elongated element having a longitudinal axis and two ends, the first element including
      1. a bulk material engaging device at one of the ends arranged to take up bulk material from the storage bed, and
      2. conveying means arranged to convey the bulk material from the device to the other end,
   b. a second elongated element arranged adjacent the other end of the first element for receiving the conveyed bulk material from the first element and conveying the received bulk material away from the storage bed, the second elongated element having a longitudinal axis and two ends,
   c. two driving and guiding wheels supporting the one end of the first elongated element on the storage bed adjacent the bulk material engaging device, the two driving and guiding wheels being arranged at respective sides of a vertical plane passing through the longitudinal axis of the first element,
   d. a coupling supporting the other end of the first elongated element on one of the ends of the second elongated element, the coupling being arranged to permit pivoting of the first element in relation to the second element about a vertical axis passing through the coupling and to absorb vertical and horizontal forces, and
   e. two wheels respectively supporting the ends of the second elongated element, the wheels having stationary axles extending parallel to the longitudinal axis of the second element, one of the wheels being disposed in the vertical pivoting axis and the other wheel being a driving wheel supporting the other end of the second element.

2. The bulk material removing apparatus of claim 1, wherein the coupling comprises a first support ring affixed to the other end of the first elongated element, a second support ring affixed to to one end of the second elongated element, an annular antifriction bearing interposed between the first and second support rings, the rings being coaxial with the vertical pivoting axis, and channel means passing through the rings for transferring the bulk material from the first to the second element.

3. The bulk material removing apparatus of claim 1, wherein each of the driving and guiding wheels supporting the one end of the first element has an axle mounted for pivoting about a vertical axis spaced from the wheel, and further comprising a jacking system connected to the axles for pivoting the axles into three selected positions with respect to the first element, the axles converging upon the vertical pivoting axis of the first element in one of the selected positions and the axles converging on one of two points, one point being located on a side of the longitudinal axis of said first elongated element that is opposite the side on which the other point is located in each of the two other selected positions.

4. The bulk material removing apparatus of claim 3, wherein the jacking system comprises a double-acting hydraulic jack for each of the driving and guiding wheels, and a distributing valve system controlling the operation of the jack.

5. The bulk material removing apparatus of claim 1, further comprising support arms for the driving and guiding wheels, the support arms extending transversely to the longitudinal axis of the first elongated element and being pivoted thereto for pivoting the arms about a horizontal axis extending transversely to the element, and jacking means interconnecting the support arms and first element for changing the vertical position of the support arms and first element in relation to each other.

6. The bulk material removing apparatus of claim 5, further comprising a control system operating the jacking means, the control system comprising means for sensing the level of the first element with respect to the storage bed and means responsive to the sensing means for operating the jacking means to maintain the bulk material engaging device at the one end of the first element at a constant level.

* * * * *